United States Patent Office 2,870,210
Patented Jan. 20, 1959

2,870,210
6,10,12-TRIMETHYL-5,9-TRIDECADIEN-2-ONE

Joseph Donald Surmatis, Pompton Plains, N. J., assignor to Hoffmann-La Roche Inc., Nutley, N. J., a corporation of New Jersey No Drawing. Application December 7, 1954
Serial No. 473,725

1 Claim. (Cl. 260—593)

This invention relates to novel chemical compounds and to processes for their preparation. More particularly, it relates to the novel compound 6,10,12-trimethyl-5,9-tridecadien-2-one and to novel processes and novel chemical intermediates having utility to prepare this compound. 6,10,12-trimethyl-5,9-tridecadien-2-one is useful in the perfume, cosmetic, flavoring and pharmaceutical industries, e. g. as an odor-imparting agent in the preparation of perfumes and of scented compositions generally, and as a flavor constituent of flavoring compositions.

One comprehensive embodiment of the invention relates to a process of making 6,10,12-trimethyl-5,9-tridecadien-2-one which comprises the steps of halogenating 3,7,9-trimethyl-1,6-decadien-3-ol to produce 1-halo-3,7,9-trimethyl-2,6-decadiene, reacting the latter with a lower alkyl acetoacetate to produce 3-lower carbalkoxy-6,10,12-trimethyl-5,9-tridecadien-2-one and subjecting the latter to ketonic scission to produce 6,10,12-trimethyl-5,9-tridecadien-2-one.

The first step in the novel synthesis of the instant invention can be effected by reacting 3,7,9-trimethyl-1,6-decadien-3-ol with a halogenating agent appropriate to convert the said alcohol to a hydrohalic acid ester thereof, e. g. phosphorus tribromide, dry hydrogen chloride, and the like. It is preferred to effect the halogenation by reacting 3,7,9-trimethyl-1,6-decadien-3-ol with a concentrated aqueous solution of hydrochloric acid or hydrobromic acid, especially with commercial concentrated aqueous hydrochloric acid of approximately 37% by weight HCl concentration, or commercial concentrated aqueous hydrobromic acid of approximately 48% by weight HBr concentration, at a temperature between about 0° C. and about room temperature.

The next step in the novel synthesis can be effected by reacting the 1-halo-3,7,9-trimethyl-2,6-decadiene with a lower alkyl acetoacetate, e. g. ethyl acetoacetate or methyl acetoacetate, in the presence of an alkaline condensation agent, e. g. an alkali metal such as sodium or potassium, or an alkali metal lower alkoxide such as sodium methoxide or potassium ethoxide. In this step it is permissible to work with a crude 1-halo-3,7,9-trimethyl-2,6-decadiene as produced by the preferred method of operating the first step, without special purification of the said 1-halo-3,7,9-trimethyl-2,6-decadiene.

The final step of the novel synthesis comprises subjecting the 3-lower carbalkoxy-6,10,12-trimethyl-5,9-tridecadien-2-one produced by the second step (which compound also need not be further purified) to ketonic scission. This can be accomplished, for example, by saponifying the 3-lower carbalkoxy-6,10,12-trimethyl-5,9-tridecadien-2-one with an alkali metal hydroxide and then acidifying the resulting alkali metal salt of 3-carboxy-6,10,12-trimethyl-5,9-tridecadien-2-one and heating to complete the decarboxylation.

The starting material of the above described synthesis, 3,7,9-trimethyl-1,6-decadien-3-ol, is itself a novel compound. Although this compound is not claimed herein, the preparation thereof is described below:

PREPARATION OF 3,7,9-TRIMETHYL-1,6-DECADIEN-3-OL 438 grams of 3,5-dimethyl-1-hexen-3-ol was stirred with 1500 cc. of concentrated aqueous hydrochloric acid (37% by weight HCl concentration) at room temperature for 30 minutes. The oil layer was separated, washed twice, each time with 500 cc. of water, and dried over calcium chloride. The product obtained, 1-chloro-3,5-dimethyl-2-hexene, had $n_D^{25}=1.448$.

In a five-liter flask there was placed three liters of benzene, 429 g. of ethyl acetoacetate and 162 g. of sodium methylate. 428 g. of the product of the preceding paragraph, 1-chloro-3,5-dimethyl-2-hexene, was added at 60° C. within 30 minutes, and stirring was continued for six hours at 60–70° C. The reaction mixture was washed with two liters of water and the benzene was distilled off under a vacuum of 100 mm. to yield 3-carbethoxy-6,8-dimethyl-5-nonen-2-one as a straw-colored oil.

The entire quantity of 3-carbethoxy-6,8-dimethyl-5-nonen-2-one produced above was dissolved in 2 liters of ethyl alcohol. To this was added 200 g. of solid potassium hydroxide and 200 cc. of water. The mixture was stirred for 4 hours at 40–50° C. To the resulting solution of the potassium salt of 3-carboxy-6,8-dimethyl-5-nonen-2-one was then added concentrated aqueous hydrochloric acid (37% by weight HCl) from a separatory funnel until the solution was strongly acid. Thirty minutes were required for the addition. The solution was then stirred an additional hour at 50° C.

The reaction mixture was diluted with two liters of water and the oil layer was removed by means of a separatory funnel. The aqueous portion was extracted with 500 cc. of benzene. The combined oils were washed neutral with water and fractionated. The product 6,8-dimethyl-5-nonen-2-one distilled at 120° C. at 35 mm., $n_D^{25}=1.4432$. It had a pleasant fruity odor reminiscent of fresh apple juice. The 2,4-dinitrophenylhydrazone derivative melted at 47° C. The semicarbazone derivative melted at 114° C.

In 1.5 liters of liquid ammonia there was dissolved 41.4 g. of metallic sodium. Acetylene gas was passed into the blue colored solution, until the color changed to white. The addition of acetylene was continued for an extra 30 minutes. Then a solution of 252 grams of 6,8-dimethyl-5-nonen-2-one, dissolved in 250 cc. of ethyl ether, was dropped in within 45 minutes. The stirring was continued for fifteen hours while a slow stream of acetylene was bubbled into the reaction mixture.

The ammonia was thereupon evaporated from the reaction mixture with the aid of a slow stream of nitrogen. The residue was poured into two liters of 5% sulfuric acid. The oil layer was removed and washed neutral with water. On fractionation, 3,7,9-trimethyl-1-decyn-6-en-3-ol was obtained in a fraction distilling at 72° C. at 0.35 mm., $n_D^{25}=1.4598$.

189 g. of 3,7,9-trimethyl-1-decyn-6-en-3-ol was diluted with an equal volume of petroleum ether and placed in a flask with 18.9 grams of 5% lead-palladium-on-calcium carbonate catalyst [Lindlar, Helvetica Chimica Acta 35, 446 (1952)]. This was hydrogenated at one atmosphere gauge hydrogen pressure until 0.97 mol of hydrogen was consumed. On fractionation of the reaction mixture, there was obtained 3,7,9-trimethyl-1,6-decadien-3-ol, distilling at 129° C. at 20 mm., $n_D^{25}=1.4592$.

The invention is further disclosed in the following examples, which are illustrative but not limitative thereof, the invention being limited only by the appended claim.

Example 1

142 grams of 3,7,9-trimethyl-1,6-decadien-3-ol was stirred for one hour with 450 cc. of concentrated aqueous hydrochloric acid (37% by weight HCl) at 25° C. The oil layer was separated, washed twice with water, and dried over calcium sulfate. The dried liquid, 1-chloro-3,7,9-trimethyl-2,6-decadiene, had $n_D^{25}=1.472$.

Example 2

In a two-liter flask were placed 1000 cc. of benzene, 104 g. of ethyl acetoacetate, and 40 grams of sodium methylate. After stirring for 30 minutes, 145.5 g. of the product of Example 1, 1-chloro-3,7,9-trimethyl-2,6-decadiene, was dropped in from a separatory funnel in 30 minutes. The reaction mixture was stirred at 60° to 70° C. for four hours. After cooling to room temperature, the mixture was washed with 100 cc. of water and the benzene was removed by distillation under vacuum. The residue remaining in the flask consisted essentially of 3-carbethoxy-6,10,12-trimethyl-5,9-tridecadien-2-one.

Example 3

500 cc. of ethyl alcohol, 70 g. of potassium hydroxide, and 50 cc. of water were added to the flask containing the entire quantity of 3-carbethoxy-6,10,12-trimethyl-5,9-tridecadien-2-one produced in Example 2 above. The saponification was carried out by stirring the mixture at 40° to 50° C. for four hours. The decarboxylation of the resulting potassium salt of 3-carboxy-6,10,12-trimethyl-5,9-tridecadien-2-one was accomplished by adding concentrated aqueous hydrochloric acid to the stirred mixture until strongly acid. Stirring was then continued at 40°–50° C. for two hours. The cooled solution was diluted with 500 cc. of water. The oil layer was separated, and the aqueous portion was extracted with 500 cc. of petroleum ether. After water washing the combined oils and removing the solvent, the product was fractionated in vacuo. 6,10,12-trimethyl-5,9-tridecadien-2-one distilled at 107°–109° C. at 0.7 mm., $n_D^{25}=1.4652$. This material has a pleasant fruity fragrance and can be used to impart a fruity note to floral perfume compositions. It can also be used as a constituent of synthetic fruit flavors, such as pineapple, pear and apple. In comparison to esters previously used in analogous perfume and flavoring compositions, the novel ketone above referred to is characterized by its marked stability.

I claim:

6,10,12-trimethyl-5,9-tridecadien-2-one.

References Cited in the file of this patent

UNITED STATES PATENTS

| | | |
|---|---|---|
| 2,088,018 | Wickert et al. | July 27, 1937 |
| 2,760,998 | Surmatis | Aug. 28, 1956 |
| 2,783,257 | Surmatis et al. | Feb. 26, 1957 |

FOREIGN PATENTS

| | | |
|---|---|---|
| 471,483 | Great Britain | 1937 |
| 1,013,483 | France | 1947 |

OTHER REFERENCES

Karrer: Organic Chemistry, 4th ed., 1950, p. 705.

UNITED STATES PATENT OFFICE
CERTIFICATE OF CORRECTION

Patent No. 2,870,210                                 January 20, 1959

Joseph Donald Surmatis

It is hereby certified that error appears in the printed specification of the above numbered patent requiring correction and that the said Letters Patent should read as corrected below.

Column 3, line 17, for "100 cc. of water" read -- 1000 cc. of water --.

Signed and sealed this 12th day of May 1959.

(SEAL)
Attest:
KARL H. AXLINE
Attesting Officer

ROBERT C. WATSON
Commissioner of Patents